Jan. 2, 1968
JIRO SAWADA ETAL
3,361,629
ANTIBIOTIC FUNGINON AND A PROCESS FOR
PRODUCING, USING ASPERGILLUS CLAVATUS
Filed Aug. 7, 1964
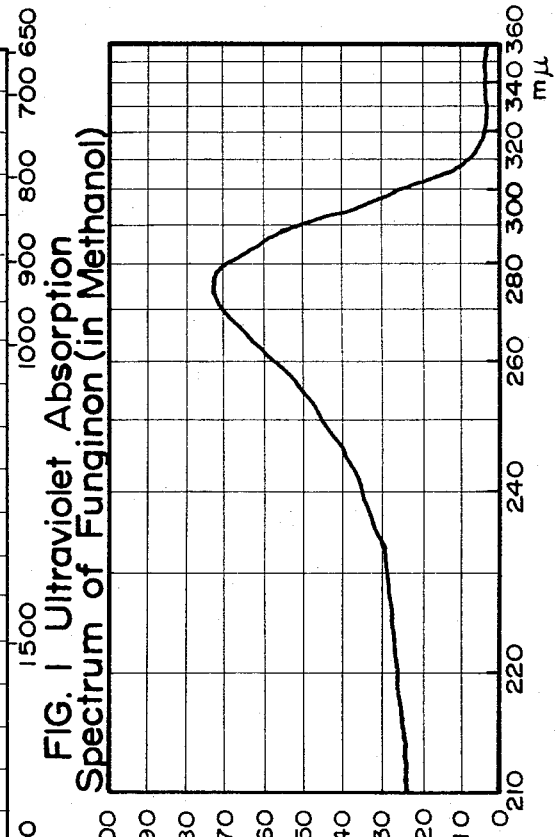
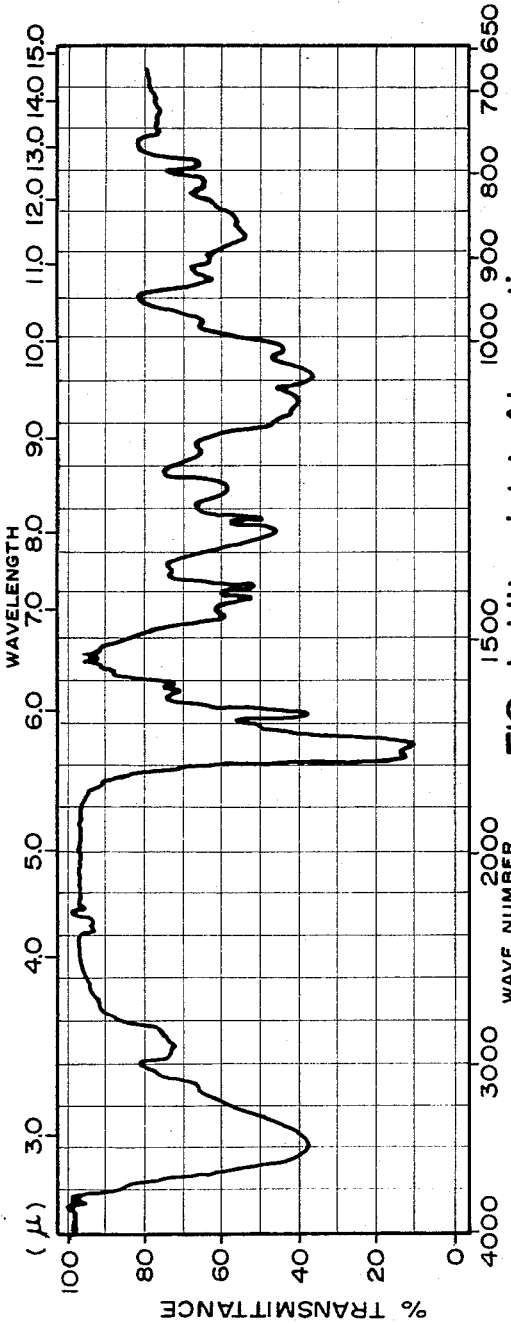
*Jiro Sawada,
Sadafumi Omura,
Hiroshi Nakayoshi,
Kazuo Okumura and
Toshiya Kitahara.*
INVENTORS
BY Wendroth, Lind
and Ponack,
ATTORNEYS 3,361,629
ANTIBIOTIC FUNGINON AND A PROCESS FOR PRODUCING, USING *ASPERGILLUS CLAVATUS*
Jiro Sawada, Kodaira, Sadafumi Omura, Tokyo, Hiroshi Nakayoshi, Chiba, Kazuo Okumura, Tokyo, and Toshiya Kitahara, Shinjuku, Tokyo, Japan, assignors to Taisho Pharmaceutical Co., Ltd., Tokyo, Japan, a corporation of Japan
Filed Aug. 7, 1964, Ser. No. 388,204
Claims priority, application Japan, Aug. 9, 1963, 38/40,813
5 Claims. (Cl. 167—65)

ABSTRACT OF THE DISCLOSURE

Funginon, having a calculated empirical formula of $C_6H_8O_4$ and a molecular weight of about 144 as measured cryoscopically, is a useful antibiotic. The ultraviolet absorption spectrum and infrared spectrum of the new antibiotic are shown respectively in FIG. 1 and FIG. 2 of the drawings.

---

This invention relates to a new antibiotic substance, and to a process for the production thereof.

More particularly, the invention relates to a new antibiotic substance designated "funginon," possessing antimicrobial activities and therapeutically useful properties.

There has heretofore been little or no demonstration of antibiotic substance coupled with low toxicity and with antifungal, antibacterial and anti-yeast activities for animals.

The object of the present invention is to obtain the most superior product comprising the above antibiotic activities. This has been accomplished by the isolation of a new microorganism which has produced a new superior antibiotic substance as hereinafter described.

It is still another object of the invention to obtain easily the new and useful antibiotic substance designated "funginon," possessing superior activities coupled with low toxicity and potential value.

Funginon possesses several therapeutic properties, and is a medicament useful for therapy of etiological fungi disease, tuberculosis, etc.

The above-mentioned new antibiotic substance, funginon, can be produced by cultivation of a new strain which resembles *Aspergillus clavatus* or *Aspergillus janus*.

The said microorganism strain was isolated from a soil sample collected in Tokyo, Japan.

The microbiological properties of the new strain, *Aspergillus clavatus* TPR-3202 (ATCC No. 15550) discovered and designated by the applicants are as follows:

MORPHOLOGIES

General morphological observation was carried out upon the new strain cultivated in Czapek-agar culture medium at 28° C. for 3 to 7 days.

Mycelium: 8 to $12\mu$ in breadth, septa, irregular branches, flocculents.
Condiophore: usually enlarged up toward the apex.
Foot-cell: mostly 500 by $5\mu$ in small, 2500 by $20\mu$ in large, wall smooth and frail.
Conidial heads clavate: 200 to 300 by 80 to $180\mu$ in fresh culture for 3 to 5 days.
Colonies: white at first and greenish-blue in full growth, constituting conidiophore, small conidial heads globose and conidial heads clavate bearing 50 to $70\mu$.
Vesicle cylindrical clavate: 180 to 200 by 21 to $63\mu$.
Sterigmata clavate: 4 to $6.5\mu$ in single series (however, when the vesicle is exceptionally globose, sterigmata often forms in a double series: primary series 7 to 10 by 4 to $4.5\mu$, and secondary series 6 to 8.5 by 2 to $2.8\mu$ in size. However, sterigmata generally forms in a single series even in this case.)
Conidiophore: globose or sub-globose, surface-smooth, not long chains, 3.5 to $4.5\mu$ in length, not spinal conidial, neither thickening cell, perithecium nor ascospore.
Colonies: no good growth of long conidiophore (however, growth of spore was better when cultivated at 25° C. than when cultivated at 30 or 37° C.).
Conidial globose: good growth upon maltose-agar culture.
Conidial clavate: good growth upon the other culture.

As mentioned above, *Aspergillus clavatus* TPR-3202 is characterized by two kinds of different conidial heads and vesicles.

DEVELOPMENT IN CZAPEK-AGAR CULTURE MEDIUM

The second day's growth upon inoculating and cultivating *Aspergillus clavatus* TPR-3202 at 25° C. showed shaped flocculated hyphae and the third day's growth constituted loose conidial heads grayish-green or white, which were of smooth surface and white in the surroundings and occasionally irregular. The seventh day's growth of its cultivation gave large colonies of 10 mm. in height and colorless back surface of colonies possessed insoluble pigment.

KOJI EXTRACT-AGAR CULTURE MEDIUM

Growth of *Aspergillus clavatus* TPR-3202 was seen with the naked eye upon cultivating at 25° C. for 2 days and it formed white velvet-like knolls and thereafter white cotton-like colonies.

The fourth day's growth gave a constitution of greenish-blue spores and greenish-blue all round colonies. The back surface of colonies showed light brown concentric circle figures. The tenth day's growth gave grayish-white colonies covered by cotton-like hyphae.

RAULIN THOM CULTURE MEDIUM

Upon cultivating at 25° C., the second day's growth of *Aspergillus clavatus* TPR-3202 gave thinly flocculated white colonies, and the fourth day's growth constituted spore on the colonies colored to greenish-blue thick flocculent. The back surface of colonies was colored grayish brown and thereafter colonies constituted concentric circle growth.

MALT EXTRACT-AGAR CULTURE MEDIUM

Upon cultivating at 30° C., the second day's growth gave white cotton-like colonies, and the third day's growth constituted spores on the colonies colored greenish-blue. Further cultivation showed flat colonies covered by short velvet-like aerial hyphae. In this state, long condiophores which possess greenish-blue conidial heads globose constituted sporadically on the colonies.

As a result of comparison of these distinguished characteristics of *Aspergillus clavatus* TPR-3202 by means of the classification described in Thom and Raper's "Manual of the Aspergilli" (1945), the new strain is shown to be similar to the *Aspergillus clavatus* group. However, detailed comparison shows that one of the characteristics of the newly discovered strain is based on constituting small globose upon the clavate conidial heads. These conidial heads bear greenish-blue conidia which are globose or sub-globose and smooth wall, and occasionally possess two series sterigmata.

For example, the distinct characteristics of the strain, Aspergillus clavatus TPR-3202, are shown in the following:

Conidia: greenish-blue, surface smooth.
Vesicle: clavate.
Conidiophore: smooth.

Recapitulating, the said microorganism useful for the preparation of "fuginon" has been designated Aspergillus clavatus TPR-3202, a newly-discovered strain similar to Aspergillus janus belonging to Aspergillus versicolor group, sydowi series, according to Thom and Raper's classification.

The newly-discovered strain, Aspergillus clavatus TPR-3202, can, however, be differentiated from the strain of Aspergillus janus from the viewpoint of characteristics: conidial wall-smooth, larger conidial heads clavate comprising conidial heads globose, single series of the sterigmata bearing on the conidial heads clavate.

According to these observations, the strain of this invention, Aspergillus clavatus TPR-3202, may also be considered to belong to the Aspergillus clavatus group, but it is distinguished from the authentic strain of the latter described in the literature in several characteristics. It may nevertheless be designated Aspergillus sp. TPR-3202.

In accordance with one aspect of the present invention, the new antibiotic substance, funginon, can be produced by cultivation of the microorganism, Aspergillus clavatus TPR-3202, in an appropriate nutrient medium under the same conditions as optimum cultivation of mold. The antibiotic is similarly produced when using a mutant or variant of Aspergillus clavatus TPR-3202 produced from the latter by various means, such as X-ray, ultra-violet radiation, etc.

Essentially, the medium contains a carbon source, a nitrogen source and trace inorganic elements.

Examples of suitable carbon sources are glucose, sucrose, lactose, maltose, soluble starch, dextrin, glycerol, etc. Suitable sources of nitrogen for the process include ammonium salt, nitrate, corn steep liquor, meat extracts, yeast extracts, soybean meal, wheat gluten, cotton seed flour, peptone, peanut meal, etc. Inorganic salts as nitrogen sources in the nutrient medium give good yield results for funginon.

Examples of suitable sources of trace inorganic elements are mineral salts, such as sodium chloride, calcium carbonate, potassium phosphate, zinc sulfate, ferrous sulfate, magnesium phosphate, etc. Presence of trace metals tends to enhance yields.

The cultivation of the newly discovered strain, Aspergillus clavatus TPR-3202, in the nutrient medium can be carired out in a number of different ways. For example, the microorganism can be cultivated under aerobic conditions on the surface of the medium (sulface culture) or it can be cultivated beneath the surface of the medium (deep culture), that is, in submerged condition, if oxygen is simultaneously supplied.

The maximum yield of the antibiotic substance, funginon, can be obtained from the culture liquid within 8 to 13 days in the former mode of operation and within 6 to 8 days in the latter procedure, under optimum conditions at temperatures between about 25 to 30° C.

In order to isolate the effective substance present in the culture mixture after completion of the fermentation phase of the process, the conventional manner usually used for the isolation of effective components contained in various fermentation mixtures may be conveniently employed.

On isolating funginon from the above-mentioned sources, such expedients as concentration of the effective substance, removal of impurities and conversion to a composition capable of being more readily purified are used, in adaptation to the properties of funginon. Thus, use may be made, for examples of absorption agents such as active-carbon or active alumina, dissolution or precipitation and extraction with organic solvents, such as butanol, ethylacetate, butylacetate, ether, chloroform, etc.

The aforesaid operations must be carried out carefully when heating with alkali is involved. Funginon is stable at the acidic side of pH range between 3.0 to 7.0 but is unstable at pH more than 7.5 and on heating.

Purified funginon is in the form of yellowish oily matter and has the following optical rotation:

$$[\alpha]_D^{20} = +43.55°$$

in water.

As shown in the accompanying FIG. 1, the maximum ultraviolet absorption shows $$E_{1cm}^{1\%} = 725 \text{ at } 273-263 \text{ m}\mu$$

in methanol.

Funginon is soluble in water, methanol, ethanol, acetone, ethylacetate, butylacetate, glacial acetic acid, ether, pyridine and dioxane, slightly soluble in chloroform, benzene and insoluble in carbon tetrachloride, petroleum ether and hexane.

Thus-obtained funginon is stable in the acidic or neutral aqueous solution in pH range of 2.0 to 7.0 at 100° C. There has been shown no decreasing of its antibiotic activity upon heating for 30 minutes. As result of cryoscopic method, the molecular weight of funginon is 144 by using dioxane.

Elemental analysis gives the following results: (1) C, 54.77; H, 5.44; O, 39.79 (by difference) (first). Analytical value: (2) C, 53.34; H, 5.33; O, 41.31 (by difference) (second).

The empirical formula $C_6H_8O_4$ corresponds to the analytical and molecular weight data, supra.

It gives positive nitro-prusside, Molisch, Benedict, Nylander, diazo, Fehling and Nessler tests and negative ferric chloride and biuret tests, and produces a large amount of brownish-black color precipitation while making no silver mirror by Tollens test.

$LD_{50}$ tests in mice of funginon show the acute toxicity to be about 20.2 mg./kg. of body weight when given intraperitoneally, 24.6 mg./kg. when given intraveneously, and 108 mg./kg. when administered orally.

Funginon shows activities against various microorganisms and the following table illustrates the antibiotic spectra of funginon:

ANTIBIOTIC SPECTRA OF FUNGINON

| Test microorganisms: | Min. inhibitory con. (mcg./ml.) |
|---|---|
| 1. Sarcina lutea | 12.5 |
| 2. Bacillus subtilis | 50 |
| 3. Bacillus megatherium | 3 |
| 4. Micrococcus flavus | >100 |
| 5. Serratia marcescens | 50 |
| 6. Proteus vulgaris HX-19 | 25 |
| 7. Klebsiella pneumoniae | 50 |
| 8. Pseudomonas aeruginosa | >100 |
| 9. Shigella flexineri KB-I | 12.5 |
| 10. Shigella flerineri KB-III | 12.5 |
| 11. Salmonella paratyphi A | 25 |
| 12. Salmonella paratyphi B | 12.5 |
| 13. Salmonella typhi H-901 | 12.5 |
| 14. Escherichia coli O55 | 12.5 |
| 15. Streptococcus pyogenes | 50 |
| 16. Diplococcus pneumoniae | 50 |
| 17. Aspergillus oryzae IAM-2683 | >100 |
| 18. Aspergillus niger | >100 |
| 19. Pencillium chrysogenum | 100 |
| 20. Trichophyton intergitale | 6 |
| 21. Trichophyton rubrum | 50 |
| 22. Trichophyton asteroides | 12.5 |
| 23. Microsporum canis | 25 |
| 24. Sporotrichum schenkii | 25 |

| Test microorganisms: | Min. inhibitory con. (mcg./ml.) |
|---|---|
| 25. *Epidermophyton floccossum* | 12.5 |
| 26. *Cryptococcus neoformans* | 12.5 |
| 27. *Saccharomyces cerevisiae* | 50 |
| 28. *Candida albicans* | 25 |
| 29. *Mycobacterium tuberculosis* H37RV | 3 |

From the above-mentioned results, it is seen that funginon is a relatively low toxic and useful medicament possessing high activity against etiological fungi and tuberculosis germs.

Growth-inhibiting tests against Ehrlich's ascites tumor cells were carried out as follows:

Used animals were selected from 4 to 5 week-old mice weighing about 15 to 20 g. 200 million of mouse-Ehrlich's ascites tumor cells were given intraperitoneally to the above described mice respectively.

After 24 hours from infecting with tumor, intraperitoneal administration of 4 mg./kg./day (80 mcg./mouse/day) and 8 mg./kg./day (160 mcg./mouse/day) of funginon was continued for a week to the infected mice. As results of the tests following 40 days observation period, funginon is shown to be effective by the intraperitoneal route at a dose of 8 mg./kg./day at which 90% maintenance is obtained for the infected animal groups with tumor and 50 to 60% maintenance is obtained with intraperitoneal administration of 4 mg./kg./day. The mice thus treated with funginon completely resist increase of infection with ascites tumor.

In view of the foregoing result, funginon is a novel antibiotic substance and is chemically and biologically different from known antibiotics, antimolds and other substances. It is of good effect in therapeutic use.

The antibiotic of the instant invention is also useful in separating and/or classifying mixtures of microorganisms for biological research and medical diagnostic purposes. It is further useful as a disinfectant agent for protecting against contamination of e.g. hospital rooms or apparatus by pathogenic microorganisms such as *Mycobacterium tuberculosis* H37V and *Trichophyton interdigitale*. It can also be employed in protecting various substrates, such as fabrics, against fungus attack.

The following example illustrates a suitable method for preparing, purifying and fractionating of funginon, but is not to be construed as a limitation of this invention, variation being possible within the spirit and scope of this invention.

Example 1

An aqueous nutrient medium (45 liters) is prepared with the following ingredients:

| | Percent by weight |
|---|---|
| Glucose | 4 |
| Sucrose | 4 |
| Sodium nitrate | 3 |
| Potassium phosphate | 1 |
| Potassium chloride | 0.5 |
| Magnesium phosphate | 0.5 |
| Ferrous sulfate | 0.01 |

The nutrient medium is placed and sterilized in a jar fermentor. Then the nutrient medium is inoculated with the funginon-producing strain, *Aspergillus clavatus* TPR-3202, and cultivated under 45 liters/min. of sterilized aeration at 28° C., with stirring at 300 r.p.m.

The cultivation is carried out for 7 days until the antibiotic substance, funginon, attains maximum yield. After completion of the fermentation, 2% by weight of diatomaceous earth is added to the fermentation broth containing funginon and the mixture is filtered with suction in order to isolate the effective substance.

On the other hand, into the filtrate is added 2% by weight of active-carbon.

The active-carbon absorbed funginon is collected and extracted with 80% acetone. After distilling off the acetone under reduced pressure, the aqueous solution is subjected to extraction with five-fold volume of ethylacetate.

A residual syrup, obtained by distilling off ethylacetate under reduced pressure, is further extracted with ether, and $Na_2SO_4$ is added to dehydrate the ether solution. The dehydrated matter is then poured onto a column containing chromatographic active alumina. Funginon is spotted at the top of the column.

The spotted column is then washed with ether, followed by developing with aqueous saturated ethylacetate. The first active ethylacetate fractions colored light yellow are collected and subjected to distilling off ethylacetate under reduced pressure. Fuginon is obtained as yellow oily matter weighing about 7.7 grams (yield 85%).

The significant maxima of the IR spectrum are as follows: IR maxima wave numbers: 3380 cm.$^{-1}$, 1680 cm.$^{-1}$, 1250 cm.$^{-1}$, 1035 cm.$^{-1}$, 2930 cm.$^{-1}$, 1450 cm.$^{-1}$, 1220 cm.$^{-1}$, 1005 cm.$^{-1}$, 1775 cm.$^{-1}$, 1403 cm.$^{-1}$, 1173 cm.$^{-1}$, 877 cm.$^{-1}$, 1750 cm.$^{-1}$, 1375 cm.$^{-1}$, 1075 cm.$^{-1}$, 829 cm.$^{-1}$, 785 cm.$^{-1}$; cf. FIG. 2 of the drawings.

What is claimed is:

1. An antibiotic substance, funginon, effective in inhibiting the growth of Gram-positive and Gram-negative microorganisms and Ehrlich's ascites tumor cells, said antibiotic substance being a yellow oily matter, and being soluble in water, methanol, ethanol, acetone, ethylacetate, butylacetate, glacial acetic acid, ether, pyridine and dioxane, slightly soluble in chloroform and in benzene and almost insoluble in carbon tetrachloride, petroleum ether and hexane; giving a brownish black color but forming no silver mirror by Tollens test, giving positive nitro-presside, Molisch, Benedict, Nylander, diazo, Fehling and Nessler tests and giving negative ferric chloride and Biuret tests; having a degree of optical rotation $[\alpha]_D^{20} = +45.55°$ (in water); containing the elements carbon, hydrogen and oxygen, having analytical value:

(1) C, 54.77; H, 5.44; O, 39.79 (by difference),
(2) C, 53.34; H, 5.33; O, 41.31 (by difference), having a molecular weight of 144 and corresponding to the empirical formula $C_6H_5O_4$, and showing the ultraviolet absorption spectrum and the infrared absorption spectrum as in the attached drawings, FIG. 1 and FIG. 2 respectively.

2. A process for the production of funginon which comprises cultivating the microorganism strain *Aspergillus clavatus* TPR-3202 (ATCC No. 15550) under aerobic conditions at a temperature of about 28° C., in an aqueous nutrient medium containing an assimilable carbon source, a nitrogen source and inorganic elements, recovering the funginon-containing mixture so-produced from the medium, and separating funginon from the said mixture.

3. The process of claim 2, wherein the carbon source is selected from the group consisting of glucose, sucrose, lactose, maltose, soluble starch, dextrin and glycerol.

4. The process of claim 2, wherein the nitrogen source is selected from the group consisting of ammonium-salt, nitrate, corn steep liquor, meat extracts, yeast extracts, soybean meal, wheat gluten, cotton seed flour, peptone and peanut meal.

5. The process of claim 2, wherein the trace inorganic element is selected from the group consisting of sodium chloride, calcium carbonate, potassium phosphate, zinc sulfate, ferrous sulfate and magnesium phosphate.

References Cited

UNITED STATES PATENTS

| 3,104,204 | 9/1963 | Olson | 167—65 |
| 3,104,208 | 9/1963 | Olson et al. | 195—80 |

ALBERT T. MEYERS, *Primary Examiner.*

D. M. STEPHENS, *Assistant Examiner.*